United States Patent

Byland et al.

[11] Patent Number: 5,094,032
[45] Date of Patent: Mar. 10, 1992

[54] POT HAVING ROOT ANCHORS

[75] Inventors: William J. Byland; Norwin G. Heimos, both of St. Louis, Mo.

[73] Assignee: Micky's Mini-Flora Express, Ltd., St. Louis, Mo.

[21] Appl. No.: 584,464

[22] Filed: Sep. 18, 1990

[51] Int. Cl.⁵ ............................................. A01G 9/02
[52] U.S. Cl. .................................... 47/66; 47/71
[58] Field of Search .............................. 47/66, 71

[56] References Cited

U.S. PATENT DOCUMENTS

| 758,678 | 5/1904 | Müller | 47/66 |
|---|---|---|---|
| 1,884,204 | 10/1933 | Pilkington . | |
| 2,810,234 | 10/1957 | Blackburn et al. | 47/66 |
| 2,834,153 | 5/1958 | Fearn . | |
| 3,002,308 | 10/1961 | DeCamp . | |
| 3,007,308 | 10/1961 | DeCamp | 206/473 |
| 3,800,469 | 4/1974 | Lau, Jr. et al. | 47/66 |
| 3,935,672 | 2/1976 | Chatelain | 47/66 |
| 4,395,845 | 8/1983 | Markowitz . | |
| 4,571,883 | 2/1986 | Shaw . | |

FOREIGN PATENT DOCUMENTS 584135 10/1958 Italy ............................ 47/71

Primary Examiner—Richard E. Chilcot, Jr.
Assistant Examiner—Joanne C. Downs
Attorney, Agent, or Firm—Senniger, Powers, Leavitt & Roedel

[57] ABSTRACT

A flower pot of this invention is of the type comprising a base and one or more side walls integrally formed with and projecting upward from the periphery of the base. The base has a plurality of hook-shaped root anchors integrally formed therewith and projecting upwardly therefrom for engagement by the roots of a plant so as to anchor the plant to the pot.

13 Claims, 1 Drawing Sheet

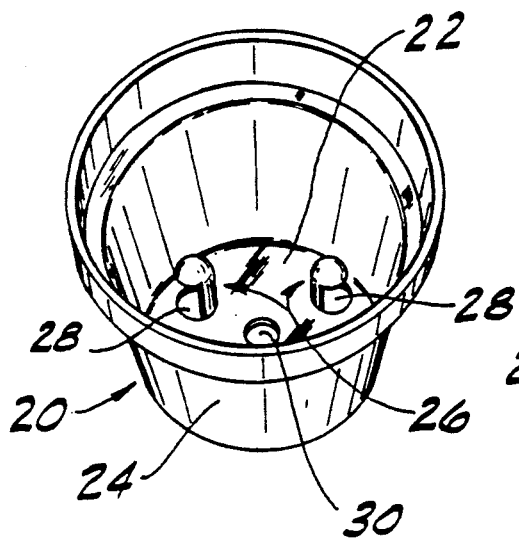
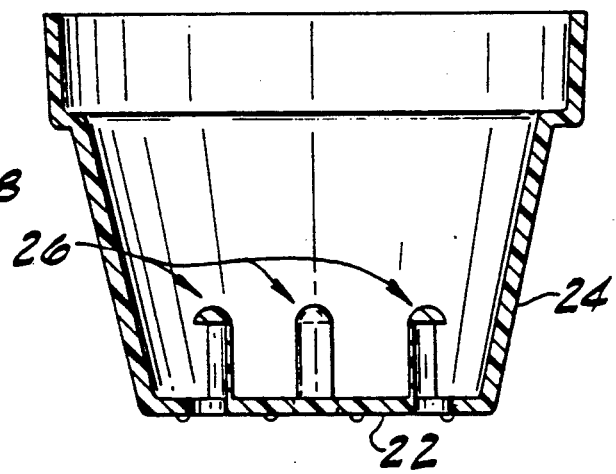
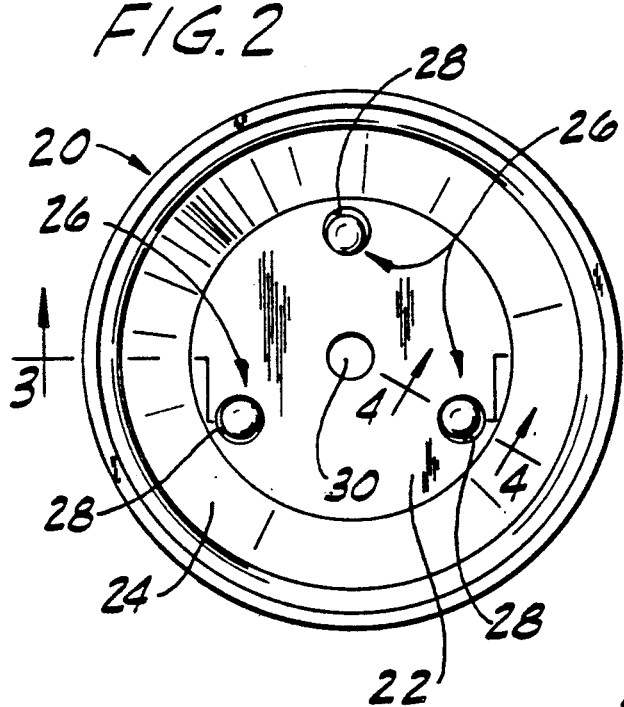
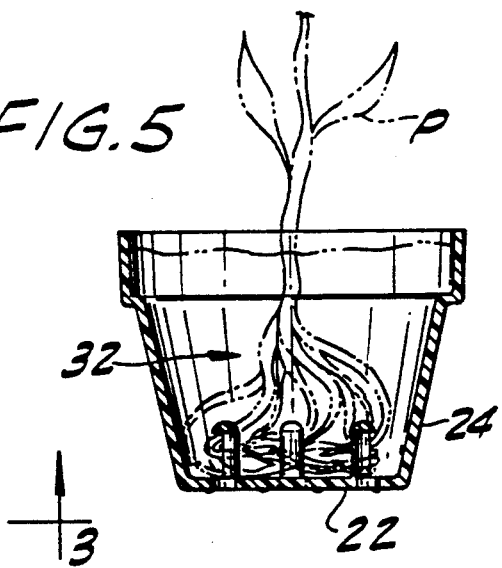
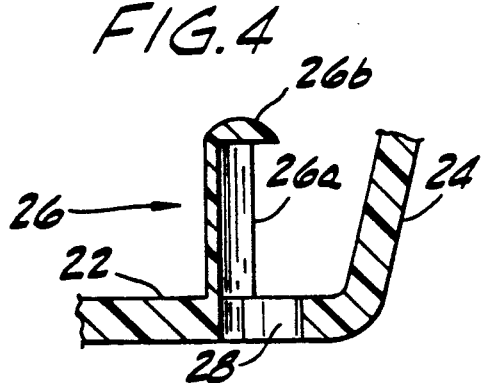

POT HAVING ROOT ANCHORS

BACKGROUND OF THE INVENTION

This invention relates generally to pots for plants such as flowers, and in particular to a plant pot of the type having root anchors which are engaged by the roots of a plant so that the plant is anchored to the pot.

Potted plants sometimes tip over, especially if they are top heavy, as where the pot is small and the plant relatively tall and large. When tip-over occurs, the plant and the potting medium may separate from the pot, in which case the plant must be repotted. Repotting is not only time consuming, it also causes trauma to the plant. Conventional pots fail to alleviate this problem, as they contain no means for holding the root system of a plant within the pot.

SUMMARY OF THE INVENTION

Among the objects of the present invention may be noted the provision of an improved pot for flowers and the like where the pot is designed to hold the plant in the pot in the event the pot is upset from its normal upright position; the provision of such a pot which anchors a plant to the pot by taking advantage of the natural growth patterns of the roots of the plant; and the provision of such a pot which is simple in design for economical manufacture.

Generally, a pot of this invention is of the type comprising a base and one or more side walls integrally formed with and projecting upward from the periphery of the base. A plurality of hook-shaped root anchors are also integrally formed with the base and project upwardly therefrom. The root anchors are adapted for engagement by the roots of a plant so as to anchor the plant to the pot.

These and other advantages and features of this invention will be in part apparent and in part pointed out hereinafter.

BRIEF DESCRIPTION OF THE DRAWINGS

FIG. 1 is a perspective view of a flower pot constructed according to the principles of the present invention;

FIG. 2 is a top plan view of the flower pot;

FIG. 3 is a cross-sectional view of the flower pot taken along the line 3—3 of FIG. 2;

FIG. 4 is an enlarged partial cross-sectional view of a hook-shaped root anchor taken along line 4—4 of FIG. 2; and FIG. 5 is a cross-sectional view of the flower pot showing roots of a plant engaging root anchors.

Corresponding reference numerals indicate corresponding parts throughout the several views of the drawings.

DETAILED DESCRIPTION OF THE PREFERRED EMBODIMENT

A plant (e.g., flower) pot constructed according to the principles of this invention, indicated generally as 20, is shown in FIGS. 1 and 2. In this preferred embodiment, the pot 20 is of molded plastic and comprises a circular base 22 and a circular side wall 24 integrally formed with and projecting upward from the periphery of the base 22. However, the present invention is not so limited and may incorporate a pot of any material of construction, a base of any shape, and any number of walls.

Three hook-shaped root anchors, indicated generally at 26, are integrally formed with the base 22 and project upwardly therefrom. While the preferred embodiment uses three hook-shaped root anchors, it will be understood that the present invention is not so limited and may include any number of root anchors greater than one. Each hook-shaped root anchor 26 comprises a shank 26a of arcuate horizontal cross section and an outer end portion 26b, for example as shown in FIG. 4. In the preferred embodiment, the shanks 26a project in a direction generally perpendicular to the base 22. The outer end portions 26b project laterally outwardly from the shanks 26a away from the center of the base. The outer end portions 26b also project in a direction generally perpendicular to the shanks 26a. Preferably, the root anchors 26 are spaced radially outward from the center of the base. The root anchors 26 are also preferably arranged at substantially equal intervals (e.g., 120° intervals) on a circle generally concentric with the base 22. The height of each anchor should be sufficient to enable the roots of a plant in the pot to securely grip the anchor, taking into account such factors as the type of plant and the extent and thickness of its roots. The height of the anchor will also depend on production (e.g., molding) factors and the size of the pot.

The base 22 of the flower pot 20 has a drain hole 28 associated with each root anchor 26, as well as a central drain hole 30. In the preferred embodiment, the drain holes 28 are located immediately adjacent their respective root anchors 26. Each drain hole 28 is located on the side of its respective root anchor 26 opposite the center of the base, generally adjacent to the side wall 24.

When the pot is used (see FIG. 5), the roots 32 of a plant P, during the course of their natural growth patterns, engage the root anchors 26 so as to anchor the plant P to the pot 20. It will be noted in this regard that the roots 32 of plant P naturally grow in a generally downward direction. When the roots 32 generally adjacent to the side wall 24 of the pot 20 reach the base 22, they begin growing circumferentially around the perimeter of the base 22 and gradually progress inwardly in spiral fashion away from the side walls 24 and toward the root anchors 26. When the roots 32 grow in this manner, they tend to wrap around the shanks 26a and under the outer end portions 26b of the root anchors 26. Thus, the roots 32 of the plant P engage the root anchors 26 to prevent separation of the roots 32 from the pot 20 in the event the pot 20 is upset from its normal upright position. While the root anchors 26 of the preferred embodiment are depicted in a specific configuration, it will be understood that they may take any shape suitable for engagement by the roots 32 of the plant P to hold the root system of the plant in the pot in the event the pot 20 tips over.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpretted as illustrative and not in a limiting sense.

What is claimed is:

1. An improved pot for a live plant with roots, said pot being of the type comprising a base and one or more side walls integrally formed with and projecting upward from the periphery of said base, the improvement comprising:

a plurality of hook-shaped root anchors integrally formed with said base and projecting upwardly therefrom for engagement by the roots of a plant so as to anchor said plant to said pot.

2. The pot according to claim 1 wherein each hook-shaped root anchor comprises a shank and an outer end portion projecting laterally outwardly from said shank.

3. The pot according to claim 1 wherein said root anchors are spaced radially outward from the center of said base.

4. The pot according to claim 2 wherein said root anchors are spaced radially outward from the center of said base, and wherein said outer end portions of the root anchors project laterally outwardly generally away from the center of said base.

5. The pot according to claim 4 wherein said shanks of the root anchors project in a direction generally perpendicular to said base.

6. The pot according to claim 5 wherein said outer end portions of the root anchors project in a direction generally perpendicular to said shanks.

7. The pot according to claim 3 wherein said root anchors are arranged at substantially equal intervals on a circle generally concentric with said base.

8. The pot according to claim 7 wherein said pot comprises 3 root anchors.

9. The pot according to claim 3 wherein said root anchors are generally adjacent but spaced from said one or more side walls.

10. The pot according to claim 9 wherein said pot is of plastic.

11. The pot according to claim 3 wherein said base has a drain hole therein associated with each root anchor.

12. The pot according to claim 11 wherein each drainhole is located immediately adjacent a respective root anchor.

13. The pot according to claim 12 wherein each drainhole is located on the side of its respective root anchor opposite the center of said base.

* * * * *